United States Patent
Suplin et al.

(10) Patent No.: US 10,457,108 B2
(45) Date of Patent: Oct. 29, 2019

(54) NON-LINEAR STIFFNESS ACTUATOR FOR VEHICLE SUSPENSION

(71) Applicant: GM Global Technology Operations LLC, Detroit, MI (US)

(72) Inventors: Vladimir Suplin, Modiin (IL); Avshalom Suissa, Kiryat Ono (IL); Klaus Trangbaek, Moshav Ein Vered (IL)

(73) Assignee: GM Global Technology Operations LLC, Detroit, MI (US)

(*) Notice: Subject to any disclaimer, the term of this patent is extended or adjusted under 35 U.S.C. 154(b) by 100 days.

(21) Appl. No.: 15/790,595

(22) Filed: Oct. 23, 2017

(65) Prior Publication Data

US 2019/0118604 A1    Apr. 25, 2019

(51) Int. Cl.
  *B60G 17/015*  (2006.01)
  *B60G 15/04*  (2006.01)
  *B60G 17/06*  (2006.01)
  *F16F 1/00*  (2006.01)

(52) U.S. Cl.
  CPC ......... *B60G 17/0152* (2013.01); *B60G 15/04* (2013.01); *B60G 17/06* (2013.01); *F16F 1/00* (2013.01); *B60G 2202/12* (2013.01); *B60G 2202/135* (2013.01); *B60G 2202/25* (2013.01); *B60G 2500/10* (2013.01)

(58) Field of Classification Search
  CPC .... B60G 17/0152; B60G 15/04; B60G 17/06; B60G 2202/12; B60G 2500/10; B60G 2202/25; B60G 2202/135
  See application file for complete search history.

(56) References Cited

U.S. PATENT DOCUMENTS

| | | | |
|---|---|---|---|
| 6,267,387 B1* | 7/2001 | Weiss | B60G 3/26 280/124.106 |
| 8,434,771 B2* | 5/2013 | Yu | B60G 17/0162 188/266.2 |
| 2003/0051958 A1* | 3/2003 | Esche | F16F 7/1005 188/379 |
| 2013/0241168 A1* | 9/2013 | Michel | B60G 17/025 280/124.166 |
| 2016/0001620 A1* | 1/2016 | Mohrlock | B60G 11/48 280/124.165 |
| 2017/0291465 A1* | 10/2017 | Christoff | B60G 3/20 |
| 2018/0029433 A1* | 2/2018 | Marble | B60G 11/00 |
| 2018/0072357 A1* | 3/2018 | Schindler | B62D 55/1083 |

* cited by examiner

*Primary Examiner* — Drew J Brown
(74) *Attorney, Agent, or Firm* — Quinn IP Law

(57) ABSTRACT

A non-linear stiffness actuator for a suspension corner employed in a vehicle includes an actuator housing and an actuator shaft configured to transmit an actuator force to the road wheel. The actuator also includes a primary elastic member assembly arranged between the actuator housing and the actuator shaft and configured to exert a primary elastic member force along the actuator shaft. The actuator additionally includes a secondary elastic member assembly configured to exert a variable secondary elastic member force acting between the actuator housing and the actuator shaft. The variable secondary elastic member force is configured to selectively contribute to and subtract from the primary elastic member force to thereby facilitate the non-linear stiffness of the actuator. A vehicle having such a non-linear stiffness actuator is also provided.

20 Claims, 6 Drawing Sheets

NON-LINEAR STIFFNESS ACTUATOR FOR VEHICLE SUSPENSION

INTRODUCTION

The present disclosure relates to a non-linear stiffness actuator for use in a vehicle suspension.

Contemporary on- and off-road going vehicles typically employ suspension systems that generally include a system of springs, shock absorbers, and linkages that connect a vehicle body to the vehicle's wheels. Because the majority of forces acting on the vehicle body are transmitted through contact patches between the road and the tires, one of the main objectives of a vehicle suspension is to maintain the contact between the vehicle's road wheels and the road surface.

Vehicle suspension systems generally contribute to the vehicle's road-holding/handling and braking, as well as provide comfort and reasonable isolation from road noise, bumps, and vibrations to the vehicle occupants. Because these objectives are generally at odds, the tuning of suspensions involves finding a compromise that is appropriate to each vehicle's intended purpose. For example, a suspension for a sporting vehicle may be tuned to give up some ride comfort in return for enhanced vehicle response, while a suspension for a luxury vehicle may be tuned for the opposite outcome. Such suspensions typically employ springs and dampers that cooperate to achieve a desired suspension tuning.

SUMMARY

A non-linear stiffness actuator for a suspension corner employed in a vehicle includes an actuator housing and an actuator shaft configured to transmit an actuator force to the road wheel. The actuator also includes a primary elastic member assembly arranged between the actuator housing and the actuator shaft and configured to exert a primary elastic member force along the actuator shaft. The actuator additionally includes a secondary elastic member assembly configured to exert a variable secondary elastic member force acting between the actuator housing and the actuator shaft. The variable secondary elastic member force is configured to selectively contribute to and subtract from the primary elastic member force to thereby facilitate the non-linear stiffness of the actuator.

The primary elastic member assembly may include a mechanism configured to adjust the primary elastic member force.

The vehicle may include an anti-roll bar. In such an embodiment, the actuator shaft may be fixed to the anti-roll bar. Additionally, the primary elastic member assembly may include a plurality of torsion springs connecting the adjustment mechanism to the anti-roll bar and the secondary elastic member assembly may be fixed to the actuator housing. Furthermore, the anti-roll bar may include a ramp element configured to compress the secondary elastic member assembly when the anti-roll bar is twisted to generate the variable secondary elastic member force acting between the actuator housing and the actuator shaft and thereby generate the non-linear stiffness of the actuator.

The adjustment mechanism may include a motor configured as at least one of an electric motor, a pneumatic servomechanism, a hydraulic servomechanism, and a transfer gear set configured to adjust the primary elastic member force.

The primary elastic member assembly may include a first spring seat connected to the motor, a second spring seat, and a compression spring arranged between the first and second spring seats.

The compression spring may be compressed between the first spring seat and the second spring seat under a weight of the vehicle body and the secondary elastic member assembly may be mounted to the second spring seat. In such an embodiment, the second spring seat may be configured to shift relative to the actuator housing in response to an input force from the road wheel.

The secondary elastic member assembly may include a plurality of secondary springs and rollers. In such an embodiment, each secondary spring may be in operative connection with a respective one of the rollers and each roller may be in operative contact with the actuator housing.

The actuator housing may be characterized by an interior surface arranged along a first axis and defining a contour configured to guide the rollers. In such an embodiment, each of the plurality of secondary springs may be configured to extend the respective roller along a second axis that is orthogonal to the first axis into contact with the contour of the interior surface to follow the contour of the interior surface upon translation of the second spring seat and thereby define the non-linear stiffness of the actuator.

The suspension corner may include a damper assembly, and the actuator shaft may be configured to compress the damper assembly.

The variable force of the secondary elastic member assembly may be configured to progressively change over a stroke of the actuator shaft to thereby selectively complement and detract from the primary elastic member force and modify the actuator force.

In a cross-sectional view, the contour of the actuator housing inner surface may include a generally hourglass shape.

Also disclosed is a vehicle having a vehicle body, a road wheel, and a suspension corner connecting the road wheel to the vehicle body. The suspension corner is configured to maintain contact between the road wheel and the road surface and provide isolation of vibration between the road wheel and the vehicle body. The suspension corner employs the non-linear stiffness actuator described above.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
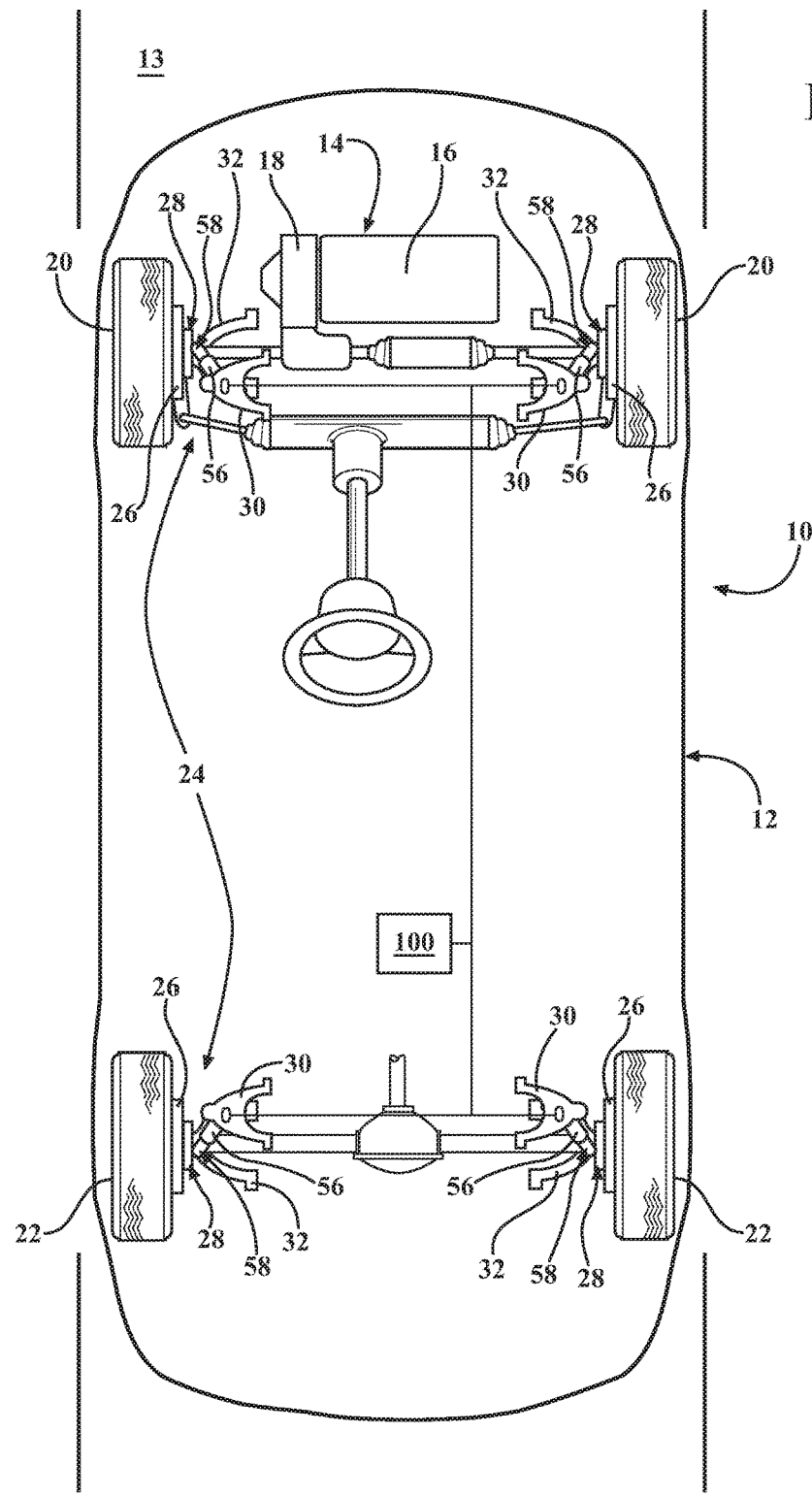
FIG. 1 is a plan view of a motor vehicle having a suspension system according to the disclosure.

Referring to the drawings, wherein like reference numbers refer to like components, FIG. 1 shows a schematic view of a motor vehicle 10, which includes a vehicle body 12. The vehicle 10 also includes a powertrain 14 configured to propel the vehicle. As shown in FIG. 1, the powertrain 14 includes an engine 16 and a transmission 18. The powertrain 14 may also include one or more motor/generators and a fuel cell, neither of which are shown, but a powertrain 14 configuration employing such devices would be appreciated by those skilled in the art.

The vehicle 10 also includes a plurality of road wheels that include front wheels 20 and rear wheels 22. Although four wheels, i.e., a pair of front wheels 20 and a pair of rear wheels 22, are shown in FIG. 1, a vehicle with fewer or greater number of wheels is also envisioned. As shown, a vehicle suspension system 24 operatively connects the body 12 to the front and rear wheels 20, 22 for maintaining contact between the wheels and a road surface 13, and for maintaining handling of the vehicle 10. The suspension system 24 includes a plurality of knuckles 26, each configured to support a respective road wheel 20, 22 via a wheel hub and bearing assembly (not shown). Each knuckle 26 may be operatively connected to the body 12 via an upper control arm 30 and a lower control arm 32.

Figure 2:
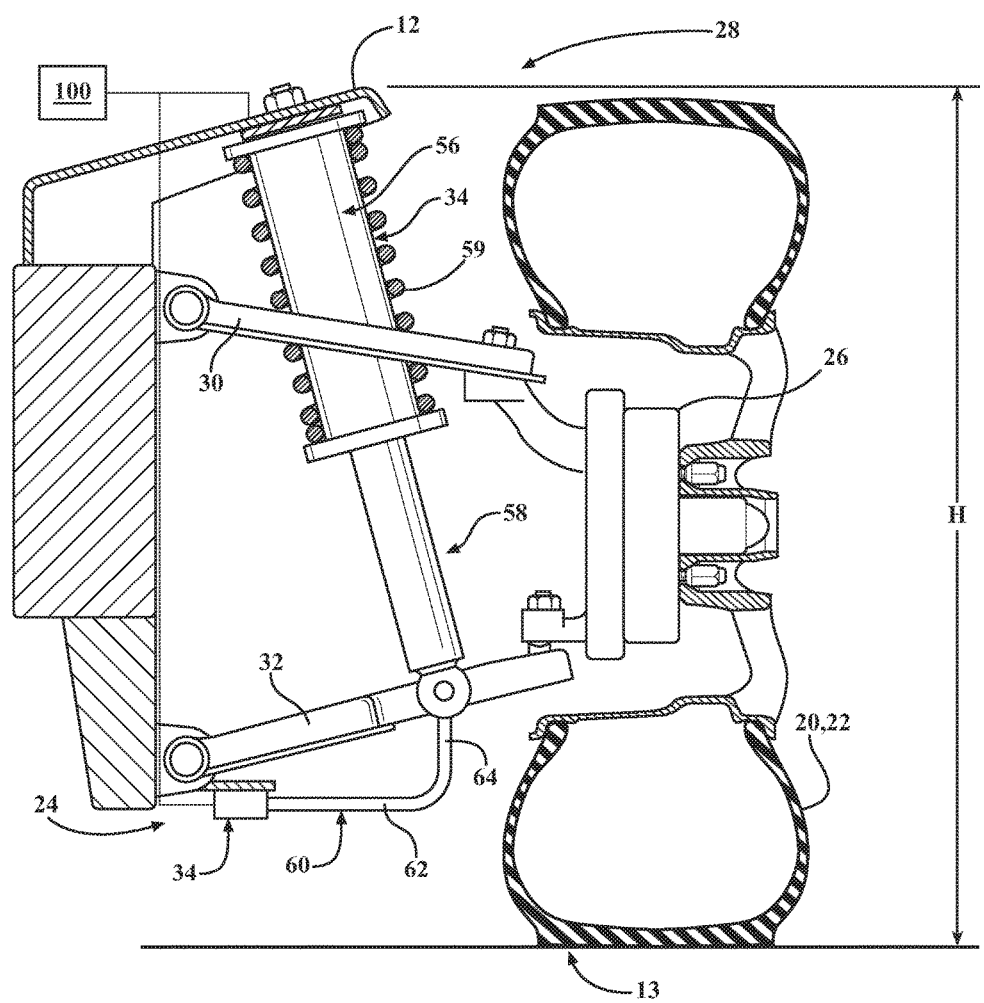
FIG. 2 is an enlarged schematic cross-sectional illustration of a representative suspension corner of the vehicle shown in FIG. 1, having a spring-damper assembly and an anti-roll bar assembly according to the disclosure.

FIG. 2 depicts a representative corner 28 of the suspension system 24, which includes a representative knuckle 26. Although a specific configuration of the suspension system 24 is shown in FIG. 2, other vehicle suspension designs are also envisioned. Accordingly, each suspension corner 28 connects its respective road wheel 20, 22 to the vehicle body 12 and is configured to maintain contact between the road wheel 20, 22 and the road surface 13, and control of the vehicle body 12 relative to the subject wheels. As also shown in FIG. 2, each individual suspension corner 28 establishes a specific height H of the vehicle body 12 relative to the road surface 13, i.e., vehicle ride height. Furthermore, each suspension corner 28 provides isolation of vibration between the respective road wheel 20, 22 and the vehicle body 12, and attenuation of excitation forces from the road surface 13, for example generated by various road surface imperfections and undulations, such as bumps and potholes.

As may be seen in FIGS. 1 and 2, each suspension corner 28 includes at least one non-linear stiffness, low-harshness actuator 34. In the depicted embodiment of the suspension corner 28, the actuator 34 is configured to generate a relatively low dynamic internal stiffness to isolate the vehicle body 12 mass from the mass of the wheels 20, 22 and the external forces or vibrations generated by the road surface 13, while exhibiting a relatively high static stiffness. From hereon, the actuator 34 will be specifically described with respect to the environment of the vehicle suspension corner 28. However, nothing precludes the non-linear stiffness, low-harshness actuator 34 from being employed in any system, vehicle or otherwise, that may benefit from two system masses being dynamically decoupled via a relatively low actuator dynamic stiffness, while at the same time having the ability to transmit a significant force in a static condition between the individual masses via a relatively high actuator static stiffness.

Figure 3:
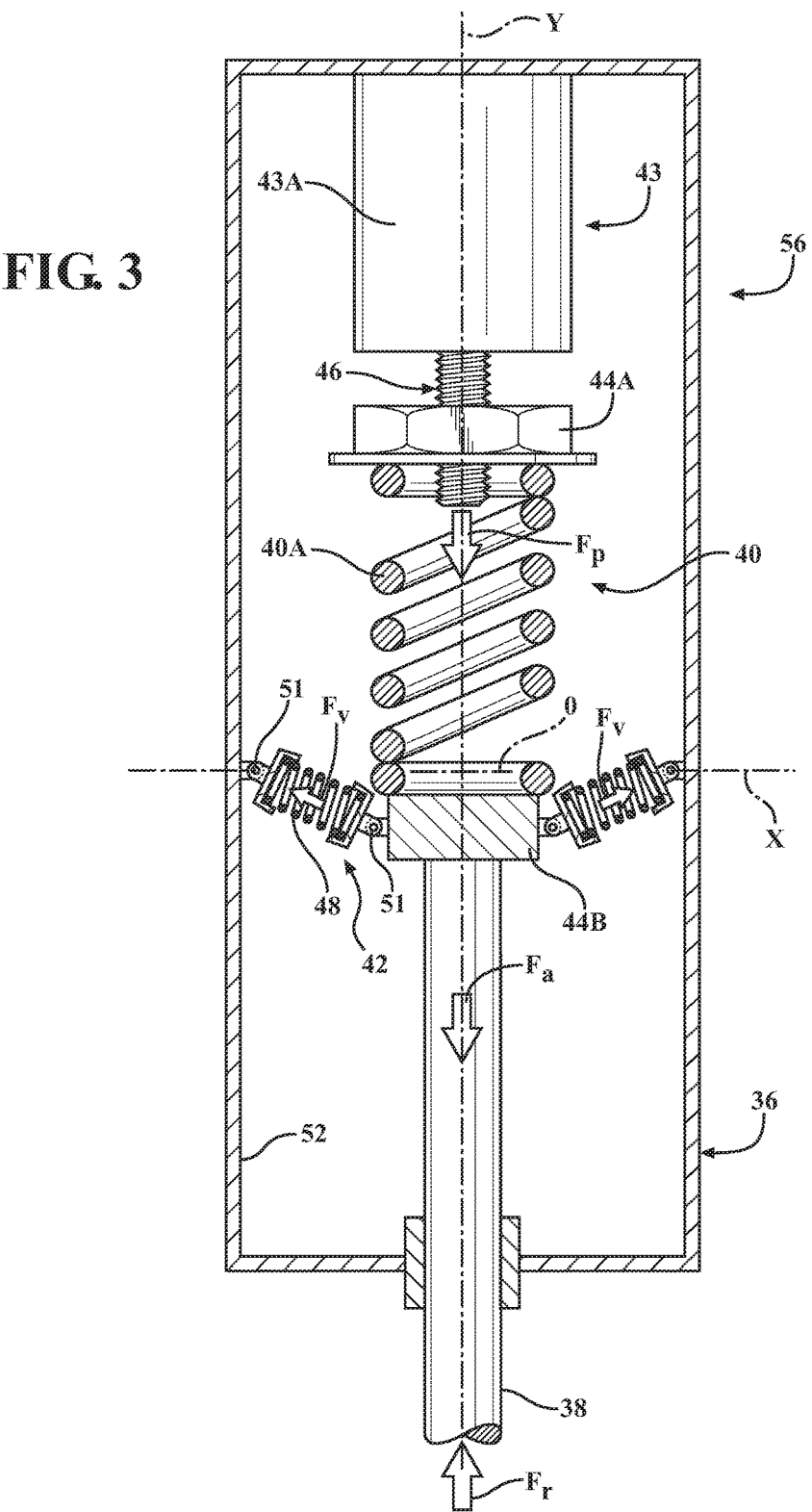
FIG. 3 is a schematic cross-sectional illustration of one embodiment of a non-linear stiffness actuator employed in the spring-damper assembly shown in FIG. 2, according to the present disclosure.
Figure 4:
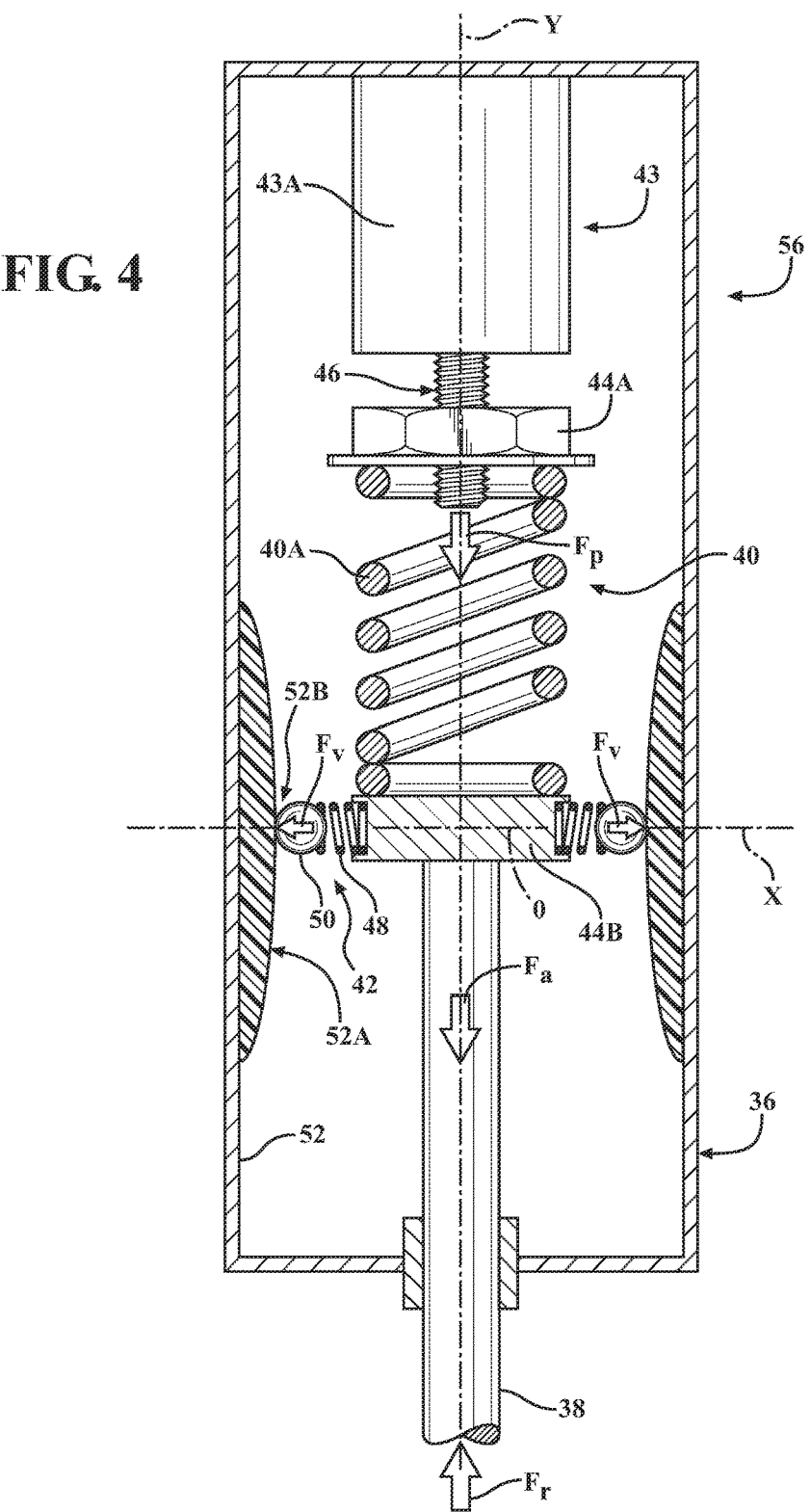
FIG. 4 is a schematic cross-sectional illustration of another embodiment of a non-linear stiffness actuator employed in the spring-damper assembly shown in FIG. 2, according to the present disclosure.
Figure 5:
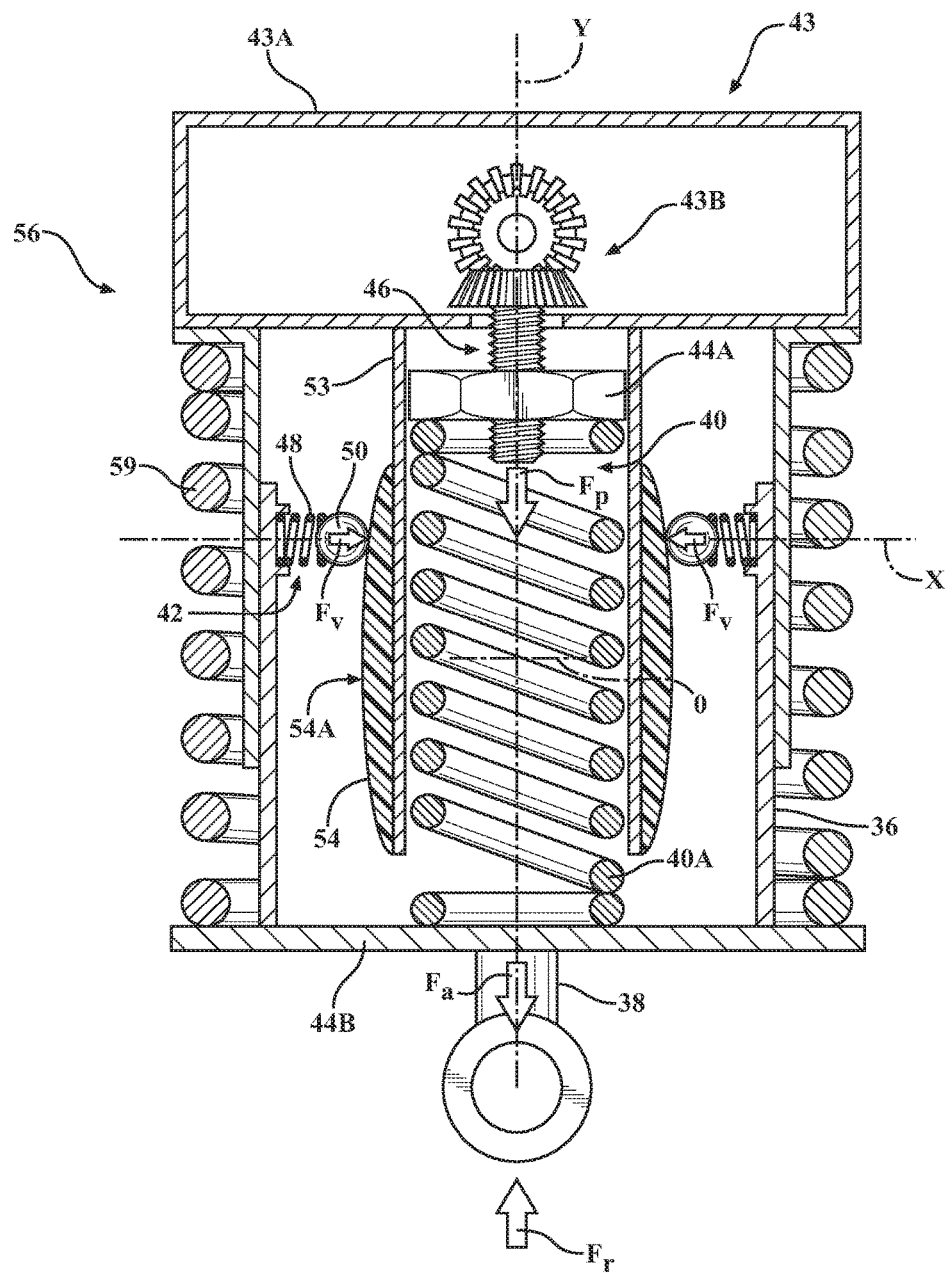
FIG. 5 is a schematic cross-sectional illustration of yet another embodiment of the non-linear stiffness actuator employed in the spring-damper assembly shown in FIG. 2, according to the present disclosure.

As shown in FIGS. 3-5, the low-harshness actuator 34 includes an actuator housing 36 configured to retain various internal components of the actuator to be discussed below. The low-harshness actuator 34 also includes an actuator shaft 38 (shown in FIGS. 3-4) configured to transmit an actuator force $F_a$ from the actuator through other components of the suspension corner 28 to the respective road wheel 20, 22. The low-harshness actuator 34 additionally includes a primary elastic member assembly 40 configured to generate a primary elastic member force $F_p$, which may be configured to suspend the vehicle body 12 relative to the respective road wheel 20, 22 and define the non-linear stiffness of the actuator 34, or to solely define the non-linear stiffness of the actuator. The primary elastic member assembly 40 is arranged between the actuator housing 36 and the actuator shaft 38, and may be configured as either a compression or a torsion spring, as will be discussed in greater detail below.

The low-harshness actuator 34 furthermore includes a secondary elastic member assembly 42 configured to generate a variable or adjustable secondary elastic member force $F_v$ acting between the actuator housing 36 and the actuator shaft 38. The actuator housing 36 includes an inner wall surface (to be described in detail below), and the variable secondary elastic member force $F_v$ acts relative to the wall surface to thereby facilitate the non-linear stiffness of the actuator 34. The variable secondary elastic member force $F_v$ is configured to progressively change over the stroke of the actuator shaft 38 to thereby selectively complement, i.e., contribute to, and detract from the primary elastic member stiffness and modify the actuator force $F_a$. As shown, the actuator housing 36 is configured to retain the actuator shaft 38, the primary elastic member assembly 40, and the secondary elastic member assembly 42.

As shown in FIGS. 3 and 4, the primary elastic member assembly 40 may include an adjustment mechanism 43 in operative connection with the primary elastic member assembly 40 and configured to adjust the initial primary elastic member force $F_p$, thereby preloading the primary elastic member assembly 40 against the actuator shaft 38. As shown, the adjustment mechanism 43 may include a motor 43A configured as at least one of an electric motor, a pneumatic or a hydraulic servomechanism, i.e., actuated and controlled by a low-energy signal received from a controller 100, such as an ECU for the vehicle 10. The adjustment mechanism 43 may additionally include a transfer gear set 43B (shown in FIG. 5) configured to transmit the force generated by the motor 43A to the primary elastic member assembly 40. The primary elastic member assembly 40 may further include a first spring seat 44A connected to the motor 43A, and a second spring seat 44B. In the embodiment of FIGS. 3 and 4, wherein the primary elastic member assembly 40 includes a compression spring 40A which is arranged between the first and second spring seats 44A, 44B, and the first spring seat 44A may be connected to the motor 43A through a threaded connection 46, for example using an adjustment screw. Alternatively, the primary elastic member assembly 40 may include a pneumatic or magnetic element configured to affect a requisite primary elastic member stiffness and exert the primary elastic force $F_p$ between the housing 36 and the actuator shaft 38.

In the embodiments of FIGS. 3 and 4, the secondary elastic member force $F_v$ may be decomposed into an X-component that acts perpendicular to the inner wall surface of the actuator housing 36 and a Y-component the acts along the wall surface. While the actuator 34 remains in a static condition, and the secondary elastic member assembly 42 is arranged in a balanced state at the 0 (zero) point on the Y axis, the Y-component of the secondary elastic member force $F_v$ is approximately equivalent to zero. As the secondary elastic member assembly 42 moves off its balanced state, the Y-component of the secondary elastic member force $F_v$ varies, and selectively complements and detracts from the actuator force $F_a$. For example, in the shown embodiments, during excitation of the suspension corner 28, the primary elastic member assembly 40 alternately compresses and rebounds. As the primary elastic member assembly 40 is compressed, the secondary elastic member assembly 42 traverses along the inner wall surface of the actuator housing 36 toward the adjustment mechanism 43, such that the Y-component of the force $F_v$ increases in the compressive direction of the primary elastic member assembly 40, thereby decreasing the resultant actuator force $F_a$. On the other hand, as the primary elastic member assembly 40 rebounds, the secondary elastic member assembly 42 traverses along the inner wall surface of the actuator housing 36 away from the adjustment mechanism 43, such that the Y-component of the force $F_v$ increases in the rebounding direction of the primary elastic member assembly 40, thereby contributing to, i.e., increasing, the resultant actuator force $F_a$.

As shown in FIGS. 3 and 4, the spring 40A is arranged and compressed between the first and second spring seats 44A, 44B. Depending on whether the spring 40A is configured to suspend the vehicle body 12, as well as define the non-linear stiffness of the actuator 34, or to solely define the non-linear stiffness of the actuator, the spring 40A may be respectively compressed under a weight of the vehicle body 12, or by the operation of the adjustment mechanism 43. The compression spring 40A may be mounted to the second spring seat 44B, while the second spring seat may be configured to shift relative to the housing 36 in response to an input force $F_r$ from the road wheel 20, 22. Furthermore, as shown in FIGS. 4 and 5, the secondary elastic member assembly 42 may include a plurality of secondary springs 48 and rollers 50. In such an embodiment, each spring 48 is in operative connection with a respective one of the rollers 50, and each roller 50 is in operative contact with the actuator housing 36.

As indicated above, the actuator housing 36 may be characterized by a cylindrical interior or inner wall surface arranged along a first axis Y, having a circular or non-circular cross-section, and identified by numeral 52 in FIGS. 3 and 4. The inner wall surface 52 may define a contour 52A configured to guide the rollers 50 (not shown). Alternatively, as shown in FIG. 4, an additional component having or defining the contour 52A may be affixed to the inner wall surface 52. As shown, the contour 52A includes a circumferentially convex shape configured to facilitate the non-linear stiffness of the actuator 34. In a separate embodiment shown in FIG. 3, each spring 48 may be operatively connected to the inner wall surface 52 via respective hinges 51, and in such an embodiment no rollers 50 would be required. Alternatively, the secondary elastic member assembly 42 may be implemented as pneumatic or magnetic elements configured to affect an appropriate secondary elastic member stiffness and exert the variable secondary elastic member force $F_v$ between the housing 36 and the actuator shaft 38, and thereby establish the overall or resultant actuator force $F_a$.

In the embodiment of FIGS. 3 and 4, each of the plurality of secondary springs 48 may be mounted to the second spring seat 44B and extend radially outward along a second axis X that is orthogonal to the first axis Y, toward the inner wall surface 52. Accordingly, each of the plurality of secondary springs 48 is configured to extend the respective roller 50 into contact with and follow the contour 52A of the inner wall surface 52 upon translation of the actuator shaft 38 and the second spring seat 44B and compression of the spring 40A of the primary elastic member assembly 40, and thereby define the non-linear stiffness of the actuator 34. Specifically, in a cross-sectional view shown in FIG. 3, the contour 52A of the actuator housing inner wall surface 52 may include a generally hourglass shape—a generally cylindrical body having narrow a waist portion 52B.

Alternatively, as shown in FIG. 5, a sleeve 53 having an outer surface 54 may be fixed to the motor 43A. As shown, the primary elastic member assembly 40 may be arranged or nested inside the sleeve 53. In such an embodiment, an outer surface 54 of the sleeve 53 may include an additional component with, or itself define, a contour 54A, configured to guide the rollers 50 over the stroke of the actuator shaft 38. As shown, the contour 54A includes a circumferentially concave shape configured to facilitate the non-linear stiffness of the actuator 34. In such an embodiment, the secondary springs 48 may be mounted to the interior surface 50 of the actuator housing 36 and extend radially inward along the second axis X, toward the sleeve 53. Accordingly, each of the plurality of secondary springs 48 may be configured to extend the respective roller 50 along the second axis X into contact with and follow the contour 54A of the sleeve 53 upon translation of the actuator shaft 38 and compression of the spring 40A of the primary elastic member assembly 40. As a result, in each of the embodiments of FIGS. 3-5, the plurality of secondary springs 48 working in conjunction with the rollers 50 define the non-linear stiffness of the actuator 34.

With resumed reference to FIGS. 1 and 2, the representative suspension corner 28 includes a shock absorber or damper assembly 56 configured to connect the road wheel 20, 22 to the vehicle body 12. The damper assembly 56 is operatively connected to a linear embodiment of the primary elastic member assembly 40, such that, together, the damper assembly and the primary elastic member assembly are part of a spring-damper assembly 58. Specifically, the damper assembly 56 is configured to attenuate compression and rebound oscillations of the compression spring embodiment 40A of the primary elastic member assembly 40. As a unit, the spring-damper assembly 56 is configured to control motion of the respective wheel 20, 22 during operation of the vehicle 10 and provide desired ride quality or comfort and response of the vehicle. As shown, the actuator shaft 38 is configured to operate, i.e., compress, the damper assembly 56. The primary elastic member assembly 40 in the spring-damper assembly 58 operates in the vertical direction, i.e., generally perpendicular to the road surface 13, as a linear compression spring.

As shown in FIGS. 3 and 4, the primary elastic member assembly 40 may be specifically configured to suspend the vehicle body 12 relative to the respective road wheel 20, 22 and generate a desired spring rate, i.e., stiffness, in the vertical or Y direction. However, as shown in FIG. 5, the damper assembly 56 may additionally include a suspension coil spring 59 configured to generate essential spring rate for suspending the vehicle body 12 relative to the respective road wheels 20, 22. In such an embodiment, while the coil spring 59 suspends the vehicle body 12, the non-linear-stiffness of the actuator 34 and its resultant actuator force $F_a$ is configured to selectively augment and reduce the spring rate of the coil spring 59 over dynamic articulation range of the suspension corner 28. Accordingly, the non-linear-stiffness actuator 34 permits the suspension corner 28 to exhibit both, a relatively high spring rate for appropriate dynamic control of the vehicle body 12 and a relatively low spring rate for effective isolation of the vehicle body from road disturbances.

The interaction between the contour 52A or the contour 54A and the secondary springs 48 is designed to elicit a predetermined positive stiffness of the actuator 34 from the secondary springs' unloaded state and into the initial compression stroke, while eliciting a reduced and negative effective stiffness further into the compression stroke of the primary elastic member assembly 40. Such progression from the predetermined positive stiffness to the negative effective stiffness of the actuator 34 is established by the specifically selected shape of the contour 52A or 54A and may be as gradual as required to establish desired ride characteristics for the vehicle 10. The non-linear stiffness of the actuator 34 established by the contour 52A or 54A may define a progressive change in stiffness from positive stiffness (shown in FIG. 3), through zero stiffness (shown in FIG. 4), on to negative stiffness (shown in FIG. 5), and back.

As employed herein, a positive stiffness mode of the actuator 34 is defined as a spring mode that generates an increasing force $F_a$ over a part of the actuator's compression travel taking place along the height H of the vehicle body 12. On the other hand, as also defined herein, in a zero stiffness mode the actuator 34 is configured to generate a constant force $F_a$ over some portion of the actuator's compression travel and along the height H of the vehicle body 12 as the actuator shaft 38 is translated within the damper assembly 56. As the actuator shaft 38 undergoes continued translation generally along the height H, the actuator 34 may enter a negative stiffness mode, where the actuator 34 is configured to generate a decreasing force $F_a$ over the actuator's compression travel, i.e., generally along the height H of the vehicle body 12. In the positive stiffness mode shown in FIG. 3, the actuator 34 may be configured to generate a predetermined positive force $F_a$ at static vehicle 10 ride height H. Furthermore, the actuator 34 may generate a progression from the positive stiffness mode (shown in FIG. 3) to the zero stiffness mode (shown in FIG. 4), and on to the negative stiffness mode (shown in FIG. 5). The progression between the positive, zero, and negative stiffness modes is enabled by the springs 48 being guided by the contour 52A or 54A, whether via rollers 50 or articulated by the hinges 51. Accordingly, the springs 48, with or without rollers 50, may generate a negative component of the force $F_v$, then generate a zero component of the force $F_v$ along the height H, and on to an increasing component of the force $F_v$ in a general direction of the excitation force $F_r$ from the road surface 13, as the subject springs are compressed and then relaxed by following the contour 52A or 54A.

As additionally shown in FIG. 2, the suspension system 24 may also include an anti-roll or sway bar assembly 60 configured to attach the road wheel 20, 22 to the vehicle body 12 at the respective suspension corner 28. Accordingly, the suspension system 24 of the vehicle 10 may include a separate anti-roll bar assembly 60 at each suspension corner 28. The anti-roll bar assembly 60 helps reduce roll of the vehicle body 12 relative to the road surface 13 at the respective suspension corner 28 during vehicle 10 cornering at high road speeds and/or over road irregularities via generating an anti-roll bar torque $T_b$. As shown, the anti-roll bar assembly 60 includes an anti-roll bar, or simply the bar, 62 connecting a particular road wheel 20 or 22 through a lever arm 64, and linked to the vehicle body 12 by a torsional embodiment of the primary elastic member assembly 40. The anti-roll bar assemblies 60 increase roll stiffness of the suspension system 24—the suspension's resistance to roll in turns, independent of the spring rate in the vertical direction. Accordingly, in the anti-roll bar assembly 60, the primary elastic member assembly 40 may include a torsion spring 40B (shown in FIG. 6).

Figure 6:
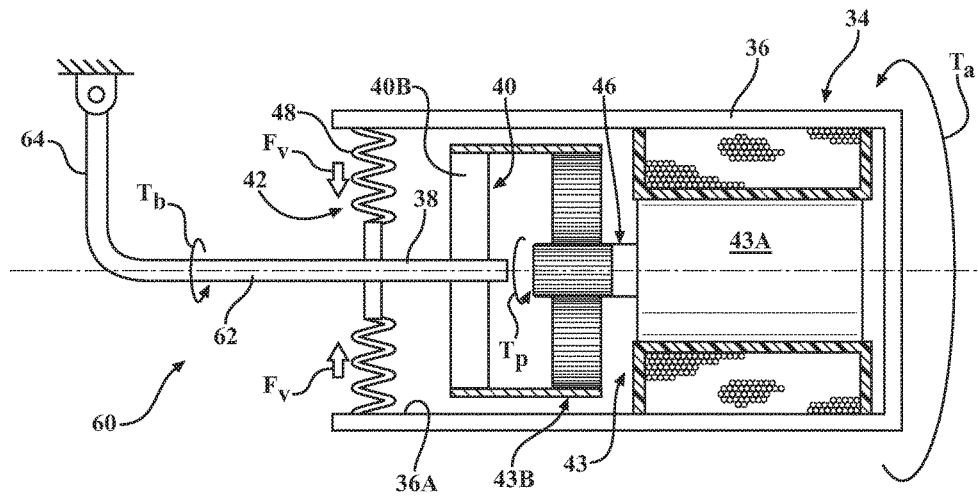
FIG. 6 is a schematic cross-sectional illustration of the embodiment of the non-linear stiffness actuator employed in the anti-roll bar assembly shown in FIG. 2, according to the present disclosure.
Figure 7:
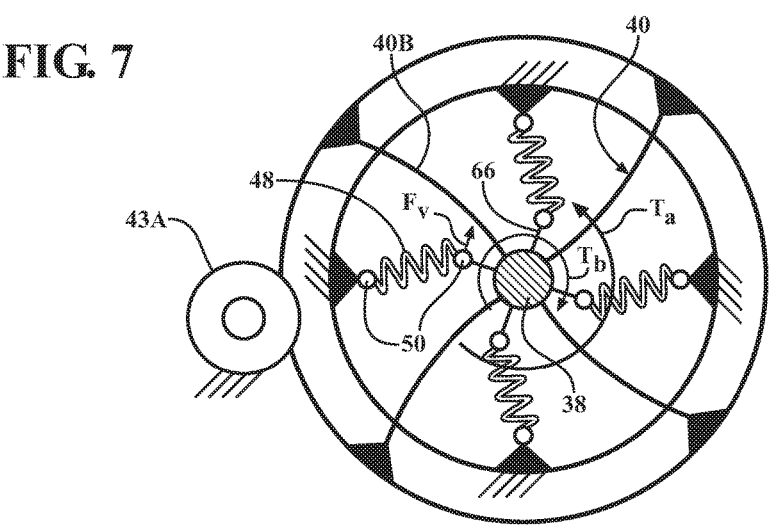
FIG. 7 is a schematic top view, depicted as a general diagram, of the non-linear stiffness actuator shown in FIG. 6.

In the embodiment of the non-linear stiffness actuator 34 employed in the anti-roll bar assembly 60, the actuator shaft 38 is fixed to or is a part of the bar 62 for synchronous rotation or actuation therewith, as shown in FIGS. 6 and 7. Additionally, the primary elastic member assembly 40 may include a plurality of torsion springs 40B connecting the adjustment mechanism 43 to the bar 62. The rotary embodiment of the low-harshness actuator 34 also includes the secondary elastic member assembly 42 (shown in FIG. 6) fixed to the actuator housing 36 and operatively connected to the bar 62. In the embodiments of FIGS. 6 and 7, the secondary elastic member assembly 42 is configured to generate the variable secondary elastic member force $F_v$ acting between the actuator housing 36 and the actuator shaft 38, and thus generate a torque $T_a$ configured to modify the overall torque $T_b$ of the anti-roll bar assembly 60 over the range of twist of the bar 62.

The actuator housing 36 includes an internal wall surface 36A, and the variable secondary elastic member force $F_v$ acts perpendicular to the wall surface 36A to thereby facilitate the non-linear stiffness of the actuator 34. The variable secondary elastic member force $F_v$ is configured to progressively change over the stroke of the actuator shaft 38. As a result, the variable secondary elastic member force $F_v$ selectively complements and detracts from the primary elastic force $F_p$, to thereby modify the overall actuator force $F_a$. As shown, the actuator housing 36 is configured to retain the actuator shaft 38, the primary elastic member assembly 40, and the secondary elastic member assembly 42. As in the embodiments of FIGS. 3 and 4, the secondary elastic member assembly 42 shown in FIGS. 5 and 6 may include a plurality of secondary springs 48 and rollers 50. As shown, each of the plurality of secondary springs 48 is fixed to the actuator housing 36.

The anti-roll bar assembly 60 includes a ramp element 66 configured to progressively compress the plurality of secondary springs 48, optionally through rollers 50, when the anti-roll bar 62 is twisted to generate the variable secondary elastic member force $F_v$ acting between the actuator housing 36 and the actuator shaft 38 and thereby generate the non-linear stiffness of the actuator 34. As shown, the rollers 50 may be mounted between the secondary springs 48 and the ramp element 66. The cooperation between the secondary springs 48 and the ramp element 66 may be configured to generate an over-center-effect, such that the secondary springs generate a force urging the bar 62 to rotate in one direction, e.g., clockwise, and past a certain "center" point of the range of rotation of the bar, in another direction, e.g., counterclockwise. Accordingly, the secondary springs 48 may selectively generate a positive stiffness to complement the anti-roll torque of the bar 62 and a negative stiffness to detract from the anti-roll torque of the bar, thereby varying the effect of the anti-roll bar assembly 60 on the ride quality of the vehicle 10.

As with the linear embodiments of the actuator 34 depicted in and described with respect to FIGS. 3-5, the rotary embodiment of the low-harshness actuator 34 depicted in FIGS. 6 and 7 may include the adjustment mechanism 43 as part of the primary elastic member assembly 40. Similarly, the adjustment mechanism 43 may be configured to preload or select the initial force $F_p$ of the primary elastic member assembly 40 resulting in an initial torque $T_p$ against the actuator shaft 38. As shown, the adjustment mechanism 43 may include the motor 43A actuated and controlled by a low-energy signal received from a controller 100, and a transfer gear set 43B configured to vary the force generated by the primary elastic member assembly 40 via the adjustment screw 46 and thereby vary the elastic member assembly torque $T_a$. As in the embodiments of FIGS. 3-5, the motor 43A is configured as at least one of an electric motor, a pneumatic or a hydraulic servomechanism, which may operate through the transfer gear set 43B to vary the force generated by the primary elastic member assembly 40.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A non-linear stiffness actuator for a suspension corner employed in a vehicle having a vehicle body and a road wheel, the non-linear stiffness actuator comprising:
   an actuator housing;
   an actuator shaft configured to transmit an actuator force to the road wheel;
   a primary elastic member assembly arranged between the actuator housing and the actuator shaft and configured to exert a primary elastic member force along the actuator shaft; and
   a secondary elastic member assembly configured to exert a variable secondary elastic member force acting between the actuator housing and the actuator shaft, wherein the variable secondary elastic member force is configured to selectively contribute to and subtract from the primary elastic member force to thereby facilitate the non-linear stiffness of the actuator.

2. The non-linear stiffness actuator according to claim 1, wherein the primary elastic member assembly includes a mechanism configured to adjust the primary elastic member force.

3. The non-linear stiffness actuator according to claim 2, wherein the vehicle includes an anti-roll bar, wherein the actuator shaft is fixed to the anti-roll bar, and wherein the primary elastic member assembly includes a plurality of torsion springs connecting the adjustment mechanism to the anti-roll bar, the secondary elastic member assembly is fixed to the actuator housing, the anti-roll bar includes a ramp element configured to compress the secondary elastic member assembly when the anti-roll bar is twisted to generate the variable secondary elastic member force acting between the actuator housing and the actuator shaft and thereby generate the non-linear stiffness of the actuator.

4. The non-linear stiffness actuator according to claim 2, wherein the adjustment mechanism includes a motor configured as at least one of an electric motor, a pneumatic servomechanism, a hydraulic servomechanism, and a transfer gear set configured to adjust the primary elastic member force.

5. The non-linear stiffness actuator according to claim 4, wherein the primary elastic member assembly includes a first spring seat connected to the motor, a second spring seat, and a compression spring arranged between the first and second spring seats.

6. The non-linear stiffness actuator according to claim 5, wherein:
   the compression spring is compressed between the first spring seat and the second spring seat under a weight of the vehicle body;
   the secondary elastic member assembly is mounted to the second spring seat; and
   the second spring seat is configured to shift relative to the actuator housing in response to an input force from the road wheel.

7. The non-linear stiffness actuator according to claim 6, wherein the secondary elastic member assembly includes a plurality of secondary springs and rollers, and wherein each secondary spring is in operative connection with a respective one of the rollers and each roller is in operative contact with the actuator housing.

8. The non-linear stiffness actuator according to claim 7, wherein the actuator housing is characterized by an interior surface arranged along a first axis and defining a contour configured to guide the rollers; and wherein each of the plurality of secondary springs is configured to extend the respective one of the rollers along a second axis that is orthogonal to the first axis into contact with the contour of the interior surface to follow the contour of the interior surface upon translation of the second spring seat and thereby define the non-linear stiffness of the actuator.

9. The non-linear stiffness actuator according to claim 1, wherein the suspension corner includes a damper assembly, and wherein the actuator shaft is configured to compress the damper assembly.

10. The non-linear stiffness actuator according to claim 1, wherein the variable force of the secondary elastic member assembly is configured to progressively change over a stroke of the actuator shaft to thereby selectively complement and detract from the primary elastic member force and modify the actuator force.

11. A vehicle comprising:
    a vehicle body;
    a road wheel configured to maintain contact with a road surface; and
    a suspension corner connecting the road wheel to the vehicle body, configured to maintain contact between the road wheel and the road surface, and including a non-linear stiffness actuator having:
      an actuator housing;
      an actuator shaft configured to transmit an actuator force;
      a primary elastic member assembly arranged between the actuator housing and the actuator shaft and configured to exert an elastic member force along the actuator shaft to the road wheel; and a secondary elastic member assembly configured to exert a variable secondary elastic member force acting between the actuator housing and the actuator shaft, wherein the variable secondary elastic member force is configured to selectively contribute to and subtract from the primary elastic member force to thereby facilitate the non-linear stiffness of the actuator.

12. The vehicle according to claim 11, wherein the primary elastic member assembly includes a mechanism configured to adjust the primary elastic member force.

13. The vehicle according to claim 12, further comprising an anti-roll bar, wherein the actuator shaft is fixed to the anti-roll bar, and wherein the primary elastic member assembly includes a plurality of torsion springs connecting the adjustment mechanism to the anti-roll bar, the secondary elastic member assembly is fixed to the actuator housing, the anti-roll bar includes a ramp element configured to compress the secondary elastic member assembly when the anti-roll bar is twisted to generate the variable secondary elastic member force acting between the actuator housing and the actuator shaft and thereby generate the non-linear stiffness of the actuator.

14. The vehicle according to claim 12, wherein the adjustment mechanism includes a motor configured as at least one of an electric motor, a pneumatic servomechanism, a hydraulic servomechanism, and a transfer gear set configured to adjust the primary elastic member force.

15. The vehicle according to claim 14, wherein the primary elastic member assembly includes a first spring seat connected to the motor, a second spring seat, and a compression spring arranged between the first and second spring seats.

16. The vehicle according to claim 15, wherein:
the compression spring is compressed between the first spring seat and the second spring seat under a weight of the vehicle body;
the secondary elastic member assembly is mounted to the second spring seat; and
the second spring seat is configured to shift relative to the actuator housing in response to an input force from the road wheel.

17. The vehicle according to claim 16, wherein the secondary elastic member assembly includes a plurality of secondary springs and rollers, and wherein each secondary spring is in operative connection with a respective one of the rollers and each roller is in operative contact with the actuator housing.

18. The vehicle according to claim 17, wherein the actuator housing is characterized by an interior surface arranged along a first axis and defining a contour configured to guide the rollers; and wherein each of the plurality of secondary springs is configured to extend the respective one of the rollers along a second axis that is orthogonal to the first axis into contact with the contour of the interior surface to follow the contour of the interior surface upon translation of the second spring seat and thereby define the non-linear stiffness of the actuator.

19. The vehicle according to claim 11, wherein the suspension corner includes a damper assembly, and wherein the actuator shaft is configured to compress the damper assembly.

20. The vehicle according to claim 11, wherein the variable force of the secondary elastic member assembly is configured to progressively change over a stroke of the actuator shaft to thereby selectively complement and detract from the primary elastic member force and modify the actuator force.

* * * * *